J. A. CUTTING.
Bee Hive.
No. 3,638.
Patented June 24, 1844.
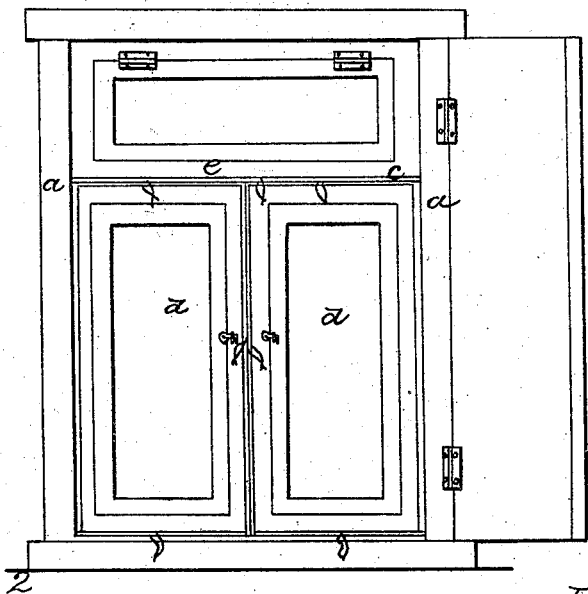
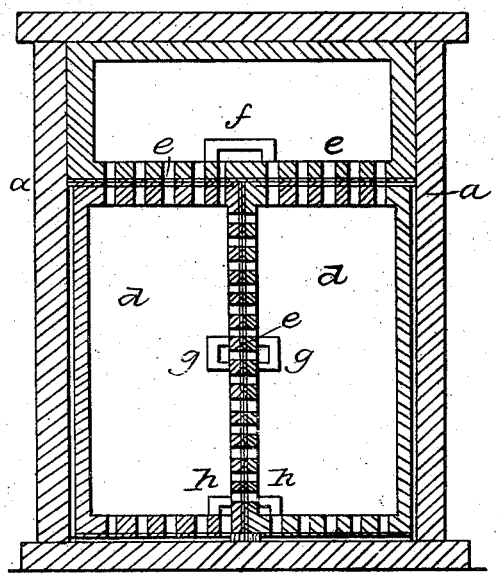
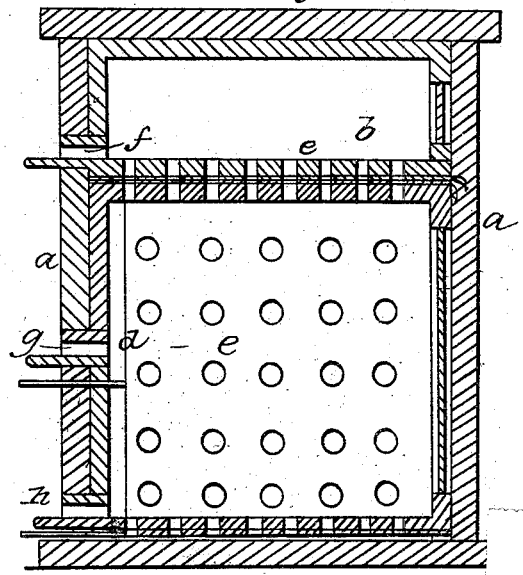

UNITED STATES PATENT OFFICE.

JAMES A. CUTTING, OF HAVERHILL, NEW HAMPSHIRE.

BEEHIVE.

Specification of Letters Patent No. 3,638, dated June 24, 1844.

*To all whom it may concern:*

Be it known that I, JAMES A. CUTTING, of Haverhill, in the county of Grafton and State of New Hampshire, have invented a new and useful Improvement in Beehives; and I do hereby declare that the following is a full, clear, and exact description thereof, reference being had to the accompanying drawing, which forms a part of this specification, in which—

Figure 1, is a geometrical elevation. Fig. 2. is a vertical section on a line parallel with the door, Fig. 3. is a section of the hive on line $x$, $x$, of Fig. 1.

The nature of my invention consists in concentrating the swarm of bees in one hive while I have all the advantage of separate drawers.

The construction is as follows: The outside case ($a$) is of any convenient size; a drawer ($b$) is fitted into its upper part, that extends across the whole size of the interior, except a small space all round for air, the bottom of this drawer is pierced with small holes for the bees to go through, similar to the sides of the drawers shown in Fig. 3: below this drawer ($b$) there are two others ($d$, $d$,) placed side by side under it, the sides and top of these drawers are filled with holes to open into each other and give free access to all parts of the hive, each side of the draw is filled with holes are furnished with slides ($e$) which are pierced with holes to compare with those in the drawers, by moving these slides a little, the holes are all closed and the drawers can either be removed at pleasure without disturbing the others, the top drawer has a tube ($f$) projecting from it, at the side opposite the door through which the bees enter the two lower drawers have two tubes of the same size as the one above, one of these ($g$) is in the center of the height and the other ($h$) under it, at the bottom of the drawers, these tubes are divided vertically through their center and one half is attached to each drawer, this construction gives a common entrance into the drawers and concentrates the bees near the partition, thus giving all the advantages of the hive with and without drawers.

What I claim as my invention and desire to secure by Letters Patent is—

1. The employment of separate or double slides between the drawers one for each constructed and arranged in the manner and for the purpose herein set forth.

2. I also claim the divided tubes in combination with the drawers constructed and arranged substantially in the manner and for the purpose herein set forth.

JAMES A. CUTTING.

Witnesses:
J. J. GREENOUGH,
LAFAYETTE CALDWELL.